Nov. 18, 1947.  E. C. PALMER  2,431,073
DOUGH WORKING MACHINE
Filed May 3, 1943
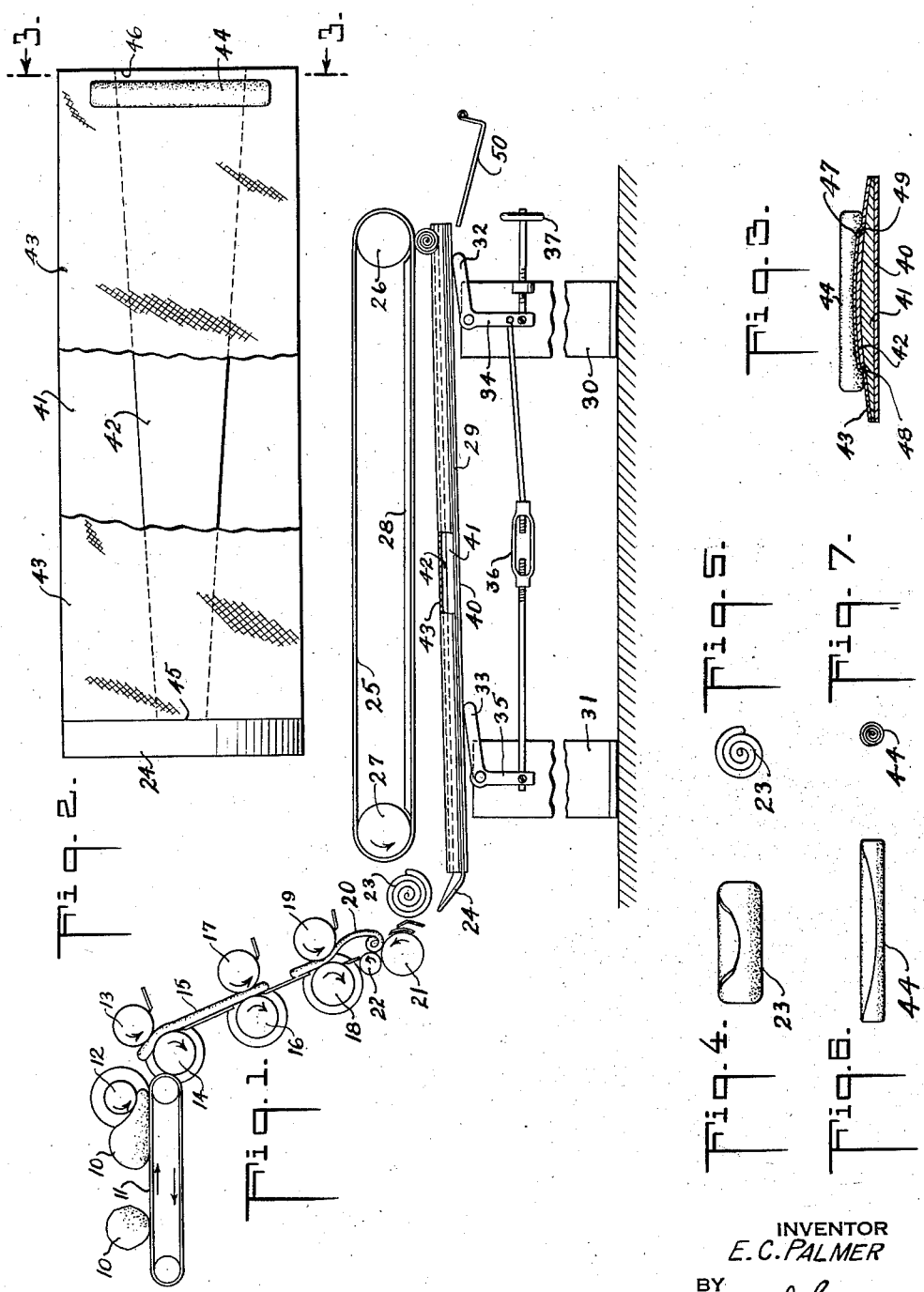
INVENTOR
E. C. PALMER
BY
Henry Savage
ATTORNEY Patented Nov. 18, 1947

2,431,073

UNITED STATES PATENT OFFICE 2,431,073

DOUGH WORKING MACHINE

Earl C. Palmer, Avenel, N. J., assignor to National Biscuit Company, New York, N. Y., a corporation of New Jersey Application May 3, 1943, Serial No. 485,535

4 Claims. (Cl. 107—9)

My invention as limited to the claims in this application relates to dough working machines and has for its principal object to provide an improved and simplified apparatus that will produce a loaf of bread of the highest quality and finest texture at decreased cost. The invention in its entirety includes a process for working the dough that is claimed in my co-pending application, Ser. No. 737,013, filed March 25, 1947.

Prior to my invention, it has been the general practice in modern bread bakeries to pass the dough through a divider where it is divided into pieces or lumps, each sufficient to form one loaf of bread. These pieces are delivered successively into a rounder where each piece is rolled into a substantially spherical ball. These balls pass through a proofer and then to a molder. In the molder, each ball is first rolled into a sheet between successive pairs of rollers and then curled or coiled into a substantially cylindrical loaf. Each cylindrical curled loaf is then passed between a rotating drum and compression plate where the convolutions are compressed and molded together so as to form a substantially homogeneous mass of elongated cylindrical shape. This dough loaf is then passed through an extender or elongater where it is rolled between a moving belt and fixed bed into a longer narrower cylindrical strip of dough. Two or more of these strips are then twisted together, usually by hand, to form the final dough loaf ready to go into a pan for baking. Heretofore this final step of twisting has been necessary in order to produce a loaf of fine texture, that is, a baked loaf free from large pockets or cells.

By means of my invention, I produce a loaf of fine texture, substantially free from objectionably large cells or bubbles, from a single piece of dough without twisting. This I do by using less and more simple apparatus that heretofore used and also by omitting the step of twisting, which requires expert hand labor, thereby considerably reducing the cost of the finished loaf.

According to my invention, I proceed in the usual manner as described above but omit the drum and its compression plate, and move the elongater up to take its place so that the loaf is delivered directly from the curler to the elongater. I have then modified the elongater so that the curled dough loaf as it passes through is squeezed first at the center and, as it progresses, the dough at the center is progressively rolled or kneaded out toward the ends as the loaf is elongated. This progressive kneading out of the dough from the center toward the ends elongates the piece without breaking down the cell structure, and since the ends are not confined, as they are by the flanges of the usual moulder drum, any air trapped between the convolutions during curling is free to escape.

In the accompanying drawings, I have illustrated apparatus according to the present invention.

Fig. 1 is a side elevation, partly in section, of one embodiment of my invention.

Fig. 2 is a top plan of my improved compression plate or bed of the elongater unit.

Fig. 3 is a section taken substantially on line 3—3 of Fig. 2 showing a dough loaf as it is about to leave the elongater.

Figs. 4 and 5 are side and end elevations, respectively, of the dough loaf as it leaves the curler.

Figs. 6 and 7 are side and end elevations, respectively, of the loaf as it leaves the elongater, ready for the baking pan.

A ball of dough 10 sufficient to form one loaf is delivered from the proofer to the belt 11 which carries it under the roller 12 where it is flattened and somewhat elongated. It then passes between the pre-sheeter rolls 13, 14 where it is further flattened and elongated as shown at 15. It then passes between the rolls 16, 17 and 18, 19 which roll it into a thin sheet 20 of uniform width, except for rounded ends. The end of this sheet is caught by the curling rollers 21, 22 which coil it into a generally cylindrical loaf 23. Side and end views of this loaf are shown in Figs. 4 and 5.

The apparatus as thus far described is a usual commercial machine and per se is not part of my invention.

Prior to my invention, the roll of dough 23 has been delivered from the curling rollers to the drum of the moulder. But I omit this moulder drum and deliver the dough directly to the receiving end 24 of the elongater.

This elongator is of usual construction except that I have modified the form and function of the pressure board so that this single unit by a single operation performs the functions and produces the results heretofore attained by the conjoint action of the moulder drum, elongater and twisting.

The elongater has a drive apron 25 passing around driving rollers 26, 27 with the lower run of the apron supported against upward movement by a plate 28. The two runs of the apron are substantially horizontal and the width is greater than the length of the finished dough loaf.

Beneath the lower run of the apron is the pressure board or table 29, which is fixed during operation but is adjustable so as to vary both its inclination and distance from the apron. The table is supported on standards 30, 31 and is adjusted through the cams 32, 33, levers 34, 35, turnbuckle 36, and hand wheel 37. This is a usual construction in commercial elongaters.

In elongaters as heretofore used, the top of the pressure board or table 29 usually is slightly convex and it rolls out or elongates the dough only very slightly, a large part of the elongation having been accomplished by the moulder drum.

I have improved the action, in fact produced a new action or function, of the elongater by giving a new contour or shape to the top of the table 29.

Fig. 3 is a cross-section of my improved table in which 40 is the bottom plate, usually of steel, on which is secured a convex working surface or pad built up from several plies of canvas 41, but other suitable materials, as wood or plastic, may be used. This working surface is of uniform width throughout the length of table. Centrally on top of this surface 41, I secure a tapered dough working element or kneader 42, which is narrowest at the entrant end of the elongater and widest at the delivery end, as shown in Fig. 2. This kneader may be built up from canvas or any other suitable material, but I have found canvas to give very satisfactory results. In order to prevent the dough from filling in and adhering to the edges of this element, I prefer to cover it with a piece of light canvas 43 which will present rounded surfaces 48, 49 so as to work or knead the dough outward gently from the center toward the ends, as shown in Fig. 3.

The coiled roll of dough 23 when it leaves the curling rolls is approximately 7 inches long and 2½ inches in diameter for a 1 lb. loaf. The space between apron 25 and table 29 at the entrant end is approximately the diameter of this roll of dough. At the exit end, where the load drops onto the shelf 50, the space is approximately 2". The length of the finished dough loaf 44, Fig. 6, is approximately 12".

The raised portion, or kneader, 42 is located centrally on the table. I have found a width of 3 inches at its entrant end 45, a width of 9 inches at its exit end 46, an overall length of 4 feet and a thickness of ¼ inch, to give satisfactory results for a 1 lb. loaf. However, these dimensions are given only by way of illustration and will be changed for different working conditions, kinds of dough, and other variables.

The coiled loaf 23 is delivered to the elongater with the narrow end 45 disposed midway of its length. As the apron 25 grips the dough and starts rolling it along the table 29, the kneader 42 will press into the lower face of the dough and squeeze it out toward the ends. As the loaf progresses, the working element by reason of its increasing width keeps rolling and kneading the dough outward toward the ends in ever increasing quantities. This kneading and rolling outward elongates the dough in such manner that large gas pockets are avoided during baking. 47 indicates the action of working the dough outward by the kneader 42. When the dough loaf 44 drops to the shelf 50 it assumes a substantially cylindrical shape due to its resiliency, as shown in Fig. 7. It is then ready to be placed in the baking pan.

It will thus be seen that by means of my invention, I can entirely dispense with the usual moulding drum and the twisting of the loaf, yet obtain all the advantages that have been derived from their use heretofore. By dispensing with the drum and twisting, a considerable saving is made both in initial investment in equipment and cost of the finished loaf. The dough after it leaves the curler is prepared ready for panning in one continuous operation of kneading and rolling by a single simple piece of apparatus.

Having thus described my invention and illustrated one means for carrying it out, what I claim is:

1. In a dough working machine, an elongater having a receiving end adapted to receive a curled dough loaf, said elongater comprising a continuously driven horizontal apron, a table positioned below the apron, its receiving end being adapted to receive the curled dough loaf and being spaced from the apron approximately the diameter of the loaf, the opposite delivery end being a lesser distance from the apron, said table having a tapered kneader on its face toward said apron extending substantially the full length of the table, the narrow end of the kneader being at the receiving end and being of less width than the length of the curled loaf and increasing in width to the delivery end.

2. In a dough elongater, an adjustable table having a bottom plate, a kneader fixed to the top of said plate, said kneader tapering from end to end and extending the length of the plate, said kneader being narrowest at the receiving end of the table and increasing in width to the discharge end.

3. In a dough elongater, an adjustable table having a bottom plate, a tapered element fixed to the top of said plate, said element tapering from end to end and at its widest end being narrower than said bottom plate, said element extending the full length of the plate and being centrally located thereon, and a flexible sheet overlying said element and being substantially co-extensive with said plate, said flexible sheet covering the corners of said element so as to present rounded corners to the dough.

4. An elongater for a curled dough loaf comprising, a pressure board having a tapered kneader on its working face extending substantially the full length thereof, the narrow end of the kneader being at the receiving end of the pressure board and being of less width than the length of the curled loaf, said kneader increasing in width toward the delivery end and having rounded corners or edges where it rises above the pressure board, a continuously moving driving means extending along the pressure board over said kneader, the driving means being closest to the presure board at its delivery end and farthest therefrom at its receiving end, whereby a space of gradually decreasing width is provided between the pressure board and driving means, and means for adjusting both the width and taper of said space.

EARL C. PALMER.

REFERENCES CITED

The following references are of record in the file of this patent:

UNITED STATES PATENTS

| Number | Name | Date |
|---|---|---|
| 1,577,130 | Labeyrie et al. | Mar. 16, 1926 |
| 1,895,634 | Lanterbur et al. | Jan. 31, 1933 |

FOREIGN PATENTS

| Number | Country | Date |
|---|---|---|
| 299,159 | Italy | July 23, 1932 |
| 183,848 | Great Britain | July 26, 1923 |
| 224,670 | Germany | July 28, 1910 |